United States Patent [19]
Fortune

[11] 3,912,149
[45] Oct. 14, 1975

[54] PORTABLE DESOLDERING TOOL

[76] Inventor: William S. Fortune, 14250 Dearborn St., Panorama City, Calif. 95969

[22] Filed: Oct. 15, 1974

[21] Appl. No.: 515,003

[52] U.S. Cl. .................................. 228/20; 228/20
[51] Int. Cl.² ........................................ B23K 1/00
[58] Field of Search .............. 228/20, 19; 219/234; 15/341, 344

[56] References Cited
UNITED STATES PATENTS

| | | | |
|---|---|---|---|
| 3,114,026 | 12/1963 | Fortune | 228/19 X |
| 3,263,889 | 8/1966 | Fortune | 228/20 |
| 3,604,610 | 9/1971 | Fortune | 228/20 |

*Primary Examiner*—Donald G. Kelly
*Assistant Examiner*—Margaret M. Joyce
*Attorney, Agent, or Firm*—Daniel T. Anderson

[57] ABSTRACT

A tubular, hand held desoldering tool carrying internally a spring loaded piston assembly and having a removable nozzle element at its forward end. The piston has a finger engaging cocking portion which is exposed outwardly where a portion of the rear of the tool is, in effect, cut away. The operation of the cocking portion causes axial motion of the piston for cocking and flyback. When in the cocked position, a trigger member carried by the piston assembly engages a latch element on the tubular body which holds the piston in its forward position. Activating the trigger releases the piston for its flyback stroke; however the piston assembly may be moved forwardly, while the trigger and latch are engaged, to eject the nozzle element from the body for cleaning or replacement. A rod member carried by the piston assembly extends forwardly through the nozzle element to clean its bore with each cocking cycle.

9 Claims, 6 Drawing Figures

3,912,149

PORTABLE DESOLDERING TOOL

BACKGROUND OF THE INVENTION

1. Field of the Invention

This invention relates generally to the removal or lifting of small quantities of mobile substances such as particulate, liquid, or molten matter and, for an example, to improvements in apparatus for removing molten solder from electrical connections. Although the present invention finds particularly useful application in the field of soldering, desoldering, and rewiring in an electronic laboratory, maintenance shop, factory or hobbyist bench; and although in the cause of brevity and clarity, much of the following discussion and description of examples of the invention are directed theretoward, it is expressly to be understood that the advantages of the invention are equally well manifest in other fields, as indicated above, where such substances, usually foreign matter, are to be removed from a limited or particular portion of a body or an object such as, for further example, watches, precision tools, fine machinery, or, in the medical arts, from an animal or human body.

2. Background of the Invention

In the electrical arts as mentioned, it is often desired to desolder an electrical connection such as, for example, a wire wrapped terminal, a wire to circuit board eyelet, or the like. The removal from the connection, of the molten solder and its attendant flux or other materials without dropping or spattering onto other portions of the equipment is generally essential. Blowing or shaking the molten metal away, is therefore not an acceptable practice; and, in combination with its high mass density, the high surface tension associated with the solder makes its removal particularly difficult. Furthermore, the problem is aggravated by the requirement that the solder be removed quickly and without application of cooling means before the mechanical connection such as a wire-wrapped terminal may be taken apart.

Various non-portable central vacuum systems and highly portable and efficient hand held vacuum stroke tools have been advanced in the art and have solved certain aspects of the desoldering problems outlined; however, the former suffer from disadvantages of cost, complexity, lack of versatility, and non-portability while the latter suffer from some disadvantages, to a lesser extent, of cost and complexity. In some applications, the recoil inherent in prior art apparatus due to the flyback action of the piston-cocking shaft-knob assembly during the vacuum stroke is particularly undesirable. Typically, in these prior art devices the cocking shaft which functions as a connecting rod between the piston and the cocking knob must be relatively massive to be strong enough to cock the piston against a relatively strong loading spring. Also the cocking knob is typically large and soft, and therefore massive, for comfortable repeated cocking cycles by the hand of the operator. These criteria cause the flyback mass to be relatively large compared to the thin-walled cylindrical housing body; consequently, the outer housing suffers a recoil causing a deflection of the solder inlet tip away from the location of the molten solder.

Furthermore, in many applications for miniature vacuum cleaning functions, the expense of a complex tool is not justified. Accordingly, it has often been the practice to use a rubber squeeze-bulb to blow or suck away the foreign matter. Such squeeze-bulbs suffer the disadvantages, however, of being difficult to direct during the squeeze or release stroke and, importantly, the apparatus is difficult or impossisble to clean.

It is, accordingly, an object of the present invention to provide improved desoldering apparatus which is not subject to these and other disadvantages and limitations of the prior art.

It is another object to provide such apparatus which, while providing consistently a high amplitude of impulse air flow, has substantially no exposed flyback portion and a very low inertia associated with the flyback portions thereof causing a negligible deflection of the tool during its vacuum stroke.

It is another object to provide such apparatus which is exceedingly low in cost and simple, rugged, and reliable in its structure and performance.

It is another object to provide such apparatus which is fully operable with one hand of the operator.

It is another object to provide such apparatus which is automatically self-cleaning with each cycle or stroke of use.

It is another object to provide such apparatus which is constructed nearly entirely of a small number of plastic, molded parts which are readily assembled by very simple steps into a finished implement.

SUMMARY OF THE INVENTION

Briefly, these objects are achieved in accordance with the structural aspects of an example of the invention in which a hand held, finger operated desoldering implement includes a body barrel member having a forward, nozzle end and a major central portion having, as a function of displacement along its length, a substantially constant and smooth internal surface configuration. A tip element, of the character to be carried ejectably by its frictional engagement with the forward end of the barrel member is formed to include a forwardly extending nozzle member and a central duct therethrough for drawing mobile substance into the interiors of the barrel chamber. A spring loaded piston member is carried within the barrel member in a sliding, air seal relation with its smooth internal surface; and the piston member includes a central, forwardly extending nozzle cleaning rod for clearing the duct of foreign matter when the piston member travels fully forwardly in the barrel member. When the piston member is forced even further forwardly, it engages the tip element and at least partially ejects it as for cleaning or tip replacement. The piston member further includes a rearwardly extending, finger engageable cocking portion.

The rear portion of the barrel body member is, in effect, cut away to form a half-cylinder sheath whose axial edges lie substantially along opposite ends of a diameter of the cylindrical body member. An axial guide plate covers the half-cylinder sheath and lies substantially in the plane of said diameter. The guide plate includes track means which cooperate with the barrel body and the piston member to engage and guide its cocking portion when the latter moves rearwardly from the forward, interior portion of the barrel body: when the piston element is forward in its cocked position, it is contained and guided by the barrel body; when it moves rearwardly therefrom as in its vacuum or flyback stroke, it is guided by engagement of the cocking portion with the track means of the cover plate. The cover plate is hinged along its forward edge, at the junction of sheath with the forward portion of the barrel body, with a hinge axis parallel to said diameter. When the tool is in a cocked configuration, the cover plate may be opened outwardly to form a lever for engaging and urging the piston assembly further forwardly to eject the tip element.

A trigger element is carried by the piston assembly and when the piston is pushed fully forwardly, the trigger engages a slot in the barrel body wall. The trigger and slot are formed whereby when engaged and cocked, the piston assembly may be forced further forwardly as for tip element ejection. When the trigger is deliberately pressed, however, the piston assembly is released and permitted to fly back. The fly-back spring may be affixed in tension between the piston element and the rear of the sheath member, and it may be housed within that portion of the sheath which is covered by the cover plate.

Further details of these and other novel features and their operation and cooperation as well as additional objects and advantages of the invention will become apparent and be best understood from a consideration of the following description taken in connection with the accompanying drawing which is provided by way of illustrative example only.

DETAILED DESCRIPTION OF PREFERRED EMBODIMENT

Figure 1:
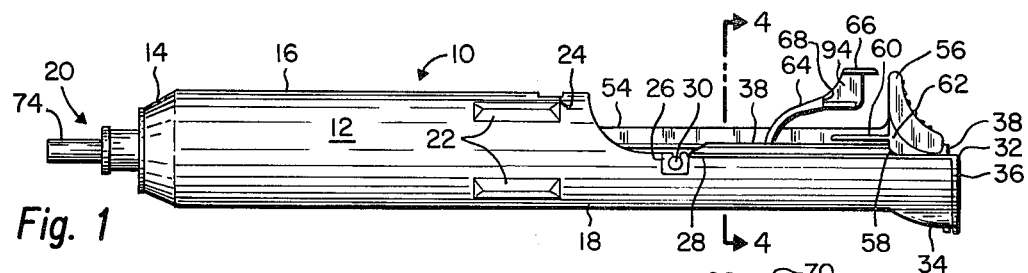
FIG. 1 is a side elevational view of an example of a portable desoldering tool constructed in accordance with the principles of the present invention in an uncocked or unloaded configuration.

With specific reference now to the Figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus in more detail than is necessary for a fundamental understanding of the invention. The description taken with the drawing will make it apparent to those skilled in the mechanical arts how the several forms of the invention may be embodied in practice. Specifically, the detailed showing is not to be taken as a limitation upon the scope of the invention which is defined by the appended claims forming, a part of this specification.

In FIG. 1, the example of the desoldering tool 10 illustrated inclues a molded body barrel 12 having a reduced diameter, tip retaining end 14, a central, cylindrical portion 16, and a rear, half cylinder sheath extension portion 18. A tip assembly 20 is disposed within the end 14. Non-roll bosses 22 provide stability on a nonlevel bench top. A trigger slot 24 is provided through the wall of the central cylindrical portion 16 near its rear edge. A pair of hinge pin retaining bosses 26 are formed in the body near the forward end of sheath portion 18 and contiguously to the axial edges 28 thereof which define the half-cylinder surface. The hinge bosses 26 each include a substantia!!y ⋯ ʿʾy aligned circular bore for receiving, rotatably, a hinge pin 30 molded integrally with a guide cover plate 32 which substantially covers the concave surface of the half-cylinder sheath portion 18 and extends from a spring retainer housing 34, over the rear 36 of the body barrel, along the edges 28 in juxtaposition therewith, and forwardly to a point axially forward of and contiguous to its hinge pins 30. As shown more clearly in subsequent figures, the guide plate 32 if formed to include, in this example, a pair of retaining, guide tracks 38 disposed along the major portion of the length of the guide plate 32.

Figure 2:
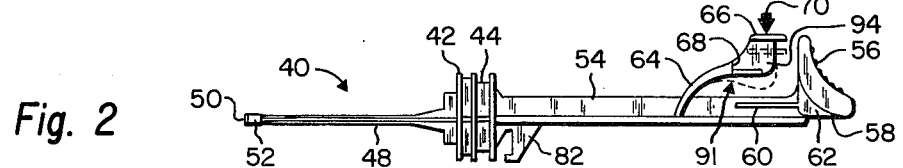
FIG. 2 is a similar view of the piston assembly portion thereof.

Further in FIG. 1 and specifically also in FIG. 2, a molded piston assembly 40 is shown which includes a piston member 42 disposed axially slidably disposed within the central portion 16 of the body barrel 12. The piston element includes an annular retaining groove 44 for holding a sealing O-ring 46 (See FIG. 3) and carries a cleaning rod 48 extending forwardly from the piston element for cleaning the central bore of the tip assembly 20. A metallic annular disc 50 may be press fit over the tip end 52 of the cleaning rod for improved cleaning and greater wear resistance.

Figure 3:
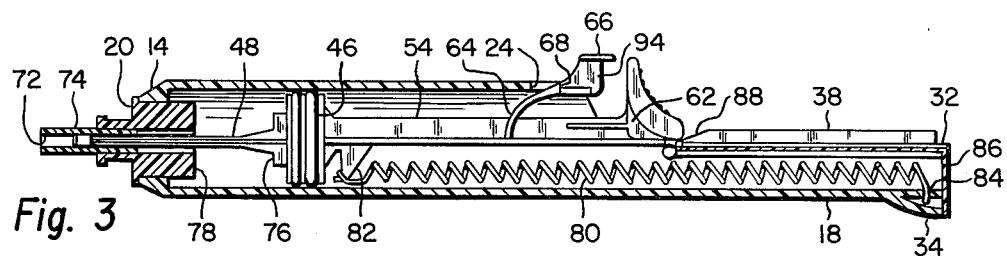
FIG. 3 is a longitudinal sectional view of the structure of FIG. 1 shown in a cocked or loaded configuration.

Extending rearwardly from the piston element 42 is a cocking shaft 54 carrying at its rearward end a cocking boss 56. At the base of the boss 56 are formed guide track retaining elements 58 (See FIG. 4) and a cylinder guide vane 60 which inserts into the rear of the central portion 16 of the barrel 12 when the piston assembly is displaced fully forwardly as shown in the configuration of FIG. 3. It will be appreciated, infra, that when thusly forwardly disposed, the track retaining elements 58 are forward of the ends of the guide tracks 38 and do not assist in retaining the piston assembly in alignment with the barrel; accordingly, the guide vane 60 and a forwardly protruding, circular alignment shoulder 62 maintain the desired alignment when the guide tracks are not engaged.

A trigger support element 64, flexible in the radial direction is mounted on the cocking shaft near the cocking boss and is terminated by a trigger button 66. At the juncture of the button 66 with its support 64, a trigger edge 68 is formed for latching engagement with the rear edge of the trigger slot 24. In addition, the forward edge of the trigger support element 64 forms a ramp permitting a limited further forward displacement of the piston assembly when the cocking boss 56 is forced forwardly of its normal cocked disposition as for forced ejection of the tip assembly. Whenever cocked, however, the trigger mechanism returns to the configuration shown in FIG. 3 until the trigger button 66 is depressed as indicated by the force arrow at 70

Referring to FIG. 3, the tool 10 is shown in its cocked configuration wherein the piston assembly is disposed forwardly in the central cylindrical portion 16 of the body 12 and the cleaning rod 48 is within the bore 72 of the nozzle insert 74 of the tip assembly 20. It should be noted, in connection with FIG. 3, that when the implement is cocked, the piston assembly is normally pushed further forwardly than indicated in the figure, then it is permitted to return to the point indicated where the trigger-latch surfaces engage. However, during the full forward displacement of the piston assembly, the cleaning rod traverses, and cleans, substatially the entire length of the bore 72, and the forward bosses 76 on the piston member 42 engage the rear, base surface 78 of the tip assembly 20. When it is desired to eject the tip assembly 20 from its frictional retention by the barrel end 14, the piston assembly may be forced further forwardly by applying significantly greater force in the axial forward direction to the cocking boss 56 thusly partially, at least, ejecting the tip assembly whereby it can be removed by grasping it directly with the fingers of the operator.

Further to be noted from FIG. 3 is the placement and function of the mainspring 80. It is retained, in tension, between a hook element 82 disposed contiguously to the rear of the piston member 42 and retaining slot 84 formed in the wall contiguously to the extreme rearward end 86 of the half-cylinder, sheath extention 18. The spring 80 may be formed to include retainer hook ends to engage appropriately the hook and slot 82, 84.

Figure 5:
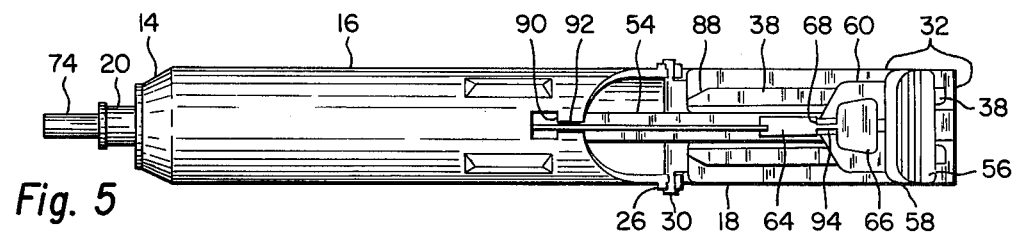
FIG. 5 is a plan view of the structure shown in FIG. 3.

Again in FIG. 3, the retaining guide tracks 38 of the guide plate 32 are illustrated. Further, in this view, the forward edges 88 of the tracks are indicated as sloped to provide an aligning ramp for the cocking boss portion of the piston assembly during its flyback, or vacuum, stroke. In FIG. 5, the ramp effect of the forward edges 88 is again shown, in plan view.

With further reference to FIG. 5, the geometry and cooperation of the trigger-latch mechanisms may be considered. The trigger slot 24 in the barrel body is seen as including a trigger edge 90 which engages, in a releasable latch relation, the trigger edge 68 of the trigger mechanism 91 of the piston assembly. The longitudinal slot 92 provides passage for the riser rib 94 which supports the trigger button 66 to its support element 64.

Figure 4:
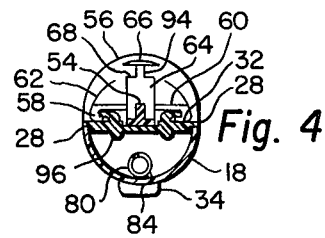
FIG. 4 is a cross sectional view thereof taken along the reference lines 4—4 of FIG. 1.

In FIG. 4, the half-cylinder configuration of the sheath extension 18 with its axial, parallel defining edges 28 and spring retainer housing 34 is illustrated in cross section. The cover guide plate 32 is also shown in further detail: a pair of reinforcing ridges 96 and the guide tracks 38 and their interlocking relation with the track retaining elements 58 of the piston assembly are illustrated. Also shown in FIG. 4 are the following additional components of the piston assembly: the cocking plunger 54, the cocking boss 56, the trigger button 66, its supporting riser rib 94, the trigger support element 64, the cylinder guide vane 60, and the cylinder alignment shoulders 62. Note also the mainspring 80 and its housed relation within the sheath portion 18.

Figure 6:
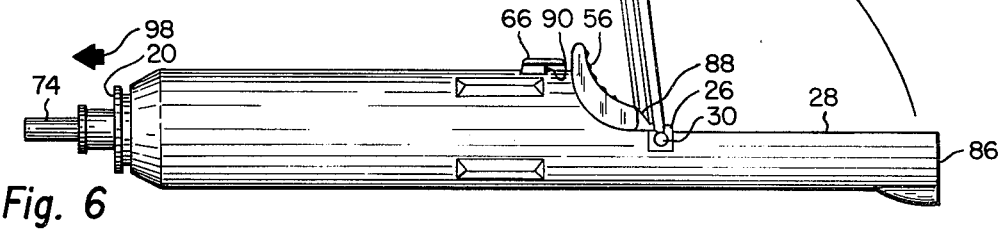
FIG. 6 is a side elevational view thereof illustrating its tip ejection operation.

With reference to FIG. 6, the tip ejecting operation of the cover guide plate is illustrated: when the piston assembly is displace in its normally fully forward position, the guide plate 32 may be lifted away from its engagement with the rearward end 86 of the sheath portion 18 and used as a lever having a fulcrum formed by the cooperation of the hinge pins 30 in the retaining bores of the pin bosses 26. In rotating the guide plate 32 in such manner 97, its engagement with the rear, base edge of the cocking boss 56 forces the piston assembly extraordinarily forwardly causing the tip assembly 20 to be ejected as shown and as indicated by the motion arrow 98.

There have thus been disclosed and described, the various features, structurally and operationally, of an implant exhibiting the advantages and achieving the objects set forth hereinabove.

What is claimed is:
1. Hand held desoldering implement comprising:
 body barrel member having
  forward tip retaining end,
  central hollow cylindrical portion,
  rear extension, sheath portion being substantially a longitudinally cut away half-cylinder extension of said central cylindrical portion, the half-cylinder extension being defined by a pair of diametrically opposed parallel axial edges,
  first guide plate hinging means disposed contiguously to the forward end of said sheath portion,
  first trigger-latch means disposed contiguously to the rear of said central cylindrical portion;
 piston assembly including
  piston body carried axially slidably within said central cylindrical portion of said body barrel member in air pumping relationship therewith,
  nozzle bore cleaning rod means extending axially centrally forwardly from said piston body,
  cocking plunger means extending rearwardly from said piston body and being terminated in a thumb engageable cocking boss,
  second trigger-latch means disposed contiguously to said cocking boss for cooperative engagement with said first trigger-latch means for selectively retaining said piston assembly forwardly in a cocked configuration,
  first cocking plunger guide means disposed contiguously to said cocking boss;
 guide plate means disposed over the concave surface of said half-cylinder sheath portion of said body barrel and extending substantially in a plane coextensive with said sheath portion between and in juxtaposition with said parallel axial edges thereof and further including
  second cocking plunger guide means disposed along its length in engageable relation with said first cocking plunger guide means of said piston assembly for guiding and constraining the rearward axial motion thereof,
  second guide plate hinging means carried by said guide plate means contiguously to its forward end and being engaged with said first guide plate means for hingedly affixing said guide plate means to said body barrel member forming an openable cover for said concave surface of said half-cylinder sheath portion and constituting a lever for engaging the rear of said cocking boss and urging said piston assembly further forwardly when said guide plate means is hingedly moved away from its said juxtaposition with respect to said parallel axial,
 defining edges of said sheath extension portion; and
 cocking spring means carried by said body barrel member connected between it and said piston assembly and against which work is done when said piston assembly is urged forwardly along said central cylindrical portion of said body barrel member and which supplies the fly back energy for said piston assembly when released by said trigger latch means.

2. The invention according to claim 1 in which said spring means is a tension spring connected between the rear of said piston body and the rear of said sheath portion and housed therewithin under said guide plate means.

3. The invention according to claim 1 which further includes a tip element of the character to be carried ejectably by frictional engagement by the forward end of said body barrel member, said tip element being formed to include a forwardly extending nozzle member having a central, axial duct therethrough communicating to the exterior of said central cylindrical portion for the travel of air and other mobile substance therethrough and through which said nozzle bore cleaning rod means passes.

4. The invention according to claim 1 in which said second cocking plunger guide means of said guide plate means comprises axial retaining track means extending along a major portion of the length thereof, and in which said first cocking plunger guide means of said piston assembly comprises track gripping boss means of the character to interlock with said axial retaining track means permitting only axial movement of said piston assembly with respect to said guide plate means.

5. The invention according to claim 4 in which said retaining track means extend from the rear of said guide plate means forwardly and terminate at a point axially contiguous to said first and second guide plate hinging means.

6. The invention according to claim 5 in which said piston assembly further includes central cylindrical portion guide means disposed contiguously to said cocking boss and extending forwardly therefrom and into the rear of said central cylindrical portion when said piston assembly is urged fully forwardly.

7. The invention according to claim 1 in which said first trigger-latch means of said body barrel member comprises a trigger receiving slot having a rearward trigger edge.

8. The invention according to claim 1 in which said second trigger-latch means of said piston assembly includes trigger support means which is elastically deformable radially inwardly.

9. The invention according to claim 8 in which said second trigger-latch further comprises a trigger boss carried by said trigger support means and being of the character to be received by said slot and retained from rearward motion by engagement with said trigger edge of said receiving slot, said first and second trigger-latch means being further of the character to permit forward motion of said piston assembly beyond its normal, cocked position.

* * * * *